(12) United States Patent
Paterek et al.

(10) Patent No.: US 9,175,999 B2
(45) Date of Patent: Nov. 3, 2015

(54) HERMETIC GLASS-TO-METAL SEAL ASSEMBLY AND METHOD OF MANUFACTURING HERMETIC GLASS-TO-METAL SEAL ASSEMBLY

(75) Inventors: Franz Dieter Paterek, Vroomshoop (NL); Albertus Jan Hendrik Kolkman, Erm (NL)

(73) Assignee: Emerson Electric Co., St. Louis, MO (US)

( * ) Notice: Subject to any disclaimer, the term of this patent is extended or adjusted under 35 U.S.C. 154(b) by 673 days.

(21) Appl. No.: 13/263,951

(22) PCT Filed: Apr. 16, 2010

(86) PCT No.: PCT/US2010/031385
§ 371 (c)(1),
(2), (4) Date: Oct. 11, 2011

(87) PCT Pub. No.: WO2010/121124
PCT Pub. Date: Oct. 21, 2010

(65) Prior Publication Data
US 2012/0034403 A1 Feb. 9, 2012

Related U.S. Application Data

(60) Provisional application No. 61/169,883, filed on Apr. 16, 2009.

(51) Int. Cl.
| | | |
|---|---|---|
| *B32B 7/02* | (2006.01) | |
| *G01F 23/02* | (2006.01) | |
| *C03C 27/04* | (2006.01) | |

(52) U.S. Cl.
CPC .............. *G01F 23/02* (2013.01); *C03C 27/046* (2013.01); *Y10T 428/12389* (2015.01); *Y10T 428/12451* (2015.01); *Y10T 428/131* (2015.01)

(58) Field of Classification Search
CPC ............ B32B 7/02; B32B 17/00; B32B 1/08; C03C 27/04; C03C 27/02; C03C 27/046; G01F 23/02; Y10T 428/12389; Y10T 428/12451; Y10T 428/131
USPC .......................................... 428/34.4, 38, 212
See application file for complete search history.

(56) References Cited

U.S. PATENT DOCUMENTS 3,525,234 A * 8/1970 Widdowson ..................... 62/217
3,837,226 A    9/1974 Kawawa
(Continued)

FOREIGN PATENT DOCUMENTS

CN      1714923      1/2006
CN     201016476     2/2008
(Continued)

OTHER PUBLICATIONS

International Search Report and Written Opinion of the ISA for PCT/US2010/031385, ISA/KR, Daejeon, Republic of Korea, mailed Nov. 26, 2010.
(Continued)

*Primary Examiner* — Aaron Austin
*Assistant Examiner* — Lawrence Ferguson
(74) *Attorney, Agent, or Firm* — Harness, Dickey & Pierce, P.L.C.

(57) ABSTRACT

A glass-to-metal hermetic seal assembly in a sight glass assembly or a hermetic terminal assembly is disclosed and includes a glass component, an intermediate component, and an outer ring. The intermediate component is provided around the glass component. The glass component is fused to the intermediate component. The outer ring, which has a coefficient of thermal expansion that is greater than a coefficient of thermal expansion of the glass component, compresses the intermediate component against the glass component to create a hermetic compression seal.

11 Claims, 3 Drawing Sheets

(56) References Cited

U.S. PATENT DOCUMENTS

| | | |
|---|---|---|
| 4,169,309 A | 10/1979 | Meginnis |
| 5,076,198 A | 12/1991 | Bottum |
| 6,928,481 B1 * | 8/2005 | Harris et al. .................. 709/228 |
| 7,633,227 B2 | 12/2009 | Dekkers et al. |
| 2002/0103069 A1 | 8/2002 | Young |
| 2003/0223139 A1 | 12/2003 | Paterek et al. |
| 2005/0072591 A1 | 4/2005 | Hayase et al. |
| 2006/0209397 A1 * | 9/2006 | Holliday et al. .............. 359/350 |
| 2007/0075643 A1 | 4/2007 | Bhosale et al. |

FOREIGN PATENT DOCUMENTS

| | | |
|---|---|---|
| EP | 0658767 | 6/1995 |
| JP | U 62-023450 | 2/1987 |
| JP | A 01-088363 | 4/1989 |
| JP | 8-110131 | 4/1996 |
| JP | A 2006-522718 | 10/2006 |
| WO | WO-2005033802 A2 | 4/2005 |

OTHER PUBLICATIONS

"Chemical Mechanical Manual, Steel Pressure Vessel Design", May 31, 1991, Chemical Mechanical Manual Editing Committee Tianjin University Press, p. 157.

"Chemical Vessel", Jan. 31, 2003, Ding Bomin et al. Chemical Industry Press, pp. 282-291.

* cited by examiner

HERMETIC GLASS-TO-METAL SEAL ASSEMBLY AND METHOD OF MANUFACTURING HERMETIC GLASS-TO-METAL SEAL ASSEMBLY

CROSS-REFERENCE TO RELATED APPLICATION

This application is a 371 U.S. National Stage of International Application No. PCT/US2010/031385, filed Apr. 16,2010, which claims the benefit of U.S. Provisional Application No. 61/169,883, filed on Apr. 16, 2009, the entire disclosures of which are incorporated herein by reference.

FIELD

The present disclosure relates to hermetic glass-to-metal seal assemblies. More specifically, the present disclosure relates to hermetic glass-to-metal seal assemblies having structures that allow for a wide selection of materials, reduce manufacturing costs, and are suitable for use in hermetically-sealed sight glass devices and hermetic terminal assemblies.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A conventional sight glass assembly may be mounted to, for example, a process tube or vessel to allow a person to view the contents (for example, fluids) inside the process tube. The sight glass assembly generally includes a glass and a metallic ring around the glass. The glass may be fused or sealed to the metallic ring. The metallic ring protects the glass therein. The sight glass assembly is mounted to the process tube by welding or brazing the metallic ring to the process tube.

Materials for the conventional sight glass and/or hermetic terminal assemblies are limited due to difficulty in joining the glass, the metallic ring, the conductor, and the process tube. In high pressure applications, the glass is generally fused to the metallic ring to form a hermetic seal there between at elevated temperatures. The metallic ring is generally required to have a high melting point to avoid rapid oxidation at the elevated temperatures. Moreover, the metallic ring is generally made of a weldable metal to allow for joining of the metallic ring to the process tube.

Laser welding may also be used to join the metallic ring to the process tube. Laser-welding requires particular skills and care to avoid generating heat shocks to the hermetic terminal assembly. Therefore, mounting the conventional sight glass and/or hermetic terminal assemblies to the process tube is time consuming and is relatively expensive.

SUMMARY

A hermetic glass-to-metal seal assembly suitable for a hermetically-sealed sight glass or a hermetic terminal assembly and a method for manufacturing it is disclosed.

A sight glass assembly according to the present disclosure includes a transparent component (e.g., a lens), an intermediate component, and an outer ring. The intermediate component is located around the periphery of the transparent component. The transparent component is joined to the intermediate component. The outer ring compresses the intermediate component, deforming it and forming a compression seal between the outer ring, the intermediate component and the transparent component. The outer ring has a coefficient of thermal expansion greater than that of the transparent component.

A sight glass assembly includes a housing body, a transparent component (e.g., a lens), an intermediate component, and an outer ring. The intermediate component is located around the peripheral boundary of transparent component. The transparent component is joined to the intermediate component. The outer ring compresses the intermediate component, deforming it and strengthening the seal between the outer ring, the intermediate component and the transparent component. The intermediate component is directly joined to the housing body by at least one of a solder joint and a brazing joint.

A hermetic terminal assembly according to the present disclosure includes a center sealing glass component, at least one current conducting member passing through the center sealing glass component, an intermediate component, and an outer ring. The intermediate component is provided around the center sealing glass component and is joined to the center sealing glass component. The outer ring compresses around the intermediate component and deforms the intermediate component. The outer ring has a coefficient of thermal expansion greater than that of the center sealing glass component.

The present disclosure further provides for a seal assembly, including a housing body, a center sealing glass component, at least one current conducting member passing through the center sealing glass component, an intermediate component, and an outer ring. The intermediate component is provided around the center sealing glass component. The outer ring compresses around the intermediate component and deforms the intermediate component.

A method of manufacturing a sight glass assembly includes: assembling the sight glass assembly that includes a transparent component, an intermediate component around the transparent component, and an outer ring around the intermediate component; heating the assembled sight glass assembly to a temperature that is equal to or greater than a glass transition temperature of a transparent component so that a molten material of the transparent component fills a gap between the transparent component and the intermediate component; cooling the assembled sight glass assembly to allow the transparent component to solidify so that the transparent component is directly fused to the intermediate component; and cold-shrinking the assembled sight glass assembly after the transparent component is directly fused to the intermediate component so that the outer ring applies a compressive force around an outer periphery of the intermediate component.

The present teachings also provide for a method of manufacturing a hermetic terminal assembly. The method includes: assembling a hermetic seal assembly that includes a center sealing glass component, at least one current conducting member passing through the center sealing glass component, an intermediate component surrounding the center sealing glass component, and an outer ring surrounding the intermediate component; heating the assembly to a temperature that is equal to or greater than a transition temperature of the center sealing glass component so that a molten material of the center sealing glass component fills a gap between the center sealing glass component and the intermediate component; cooling the assembly to allow the center sealing glass component to solidify and directly fuse to the intermediate component and current conducting member to provide a hermetic seal therebetween; and cold-shrinking the assembly after the center sealing glass component is directly fused to the intermediate component so that the outer ring applies a compressive force around an outer periphery of the intermediate component.

Additionally, a method of manufacturing a hermetic glass-to-metal compression seal assembly comprises placing an intermediate component in an outer component such that the outer component is completely surrounding the intermediate component, heating the intermediate component and outer component so that both the intermediate component and outer component thermally expand, placing a glass component within the intermediate component such that the intermediate component is completely surrounding the glass component, and cooling the intermediate component and outer component so that both the intermediate component and outer component contract due to cold-shrinkage such that the outer component applies a compressive force around the intermediate component and the glass component.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DRAWINGS

The present invention will become more fully understood from the detailed description and the accompanying drawings, wherein.

DETAILED DESCRIPTION

Figure 1:
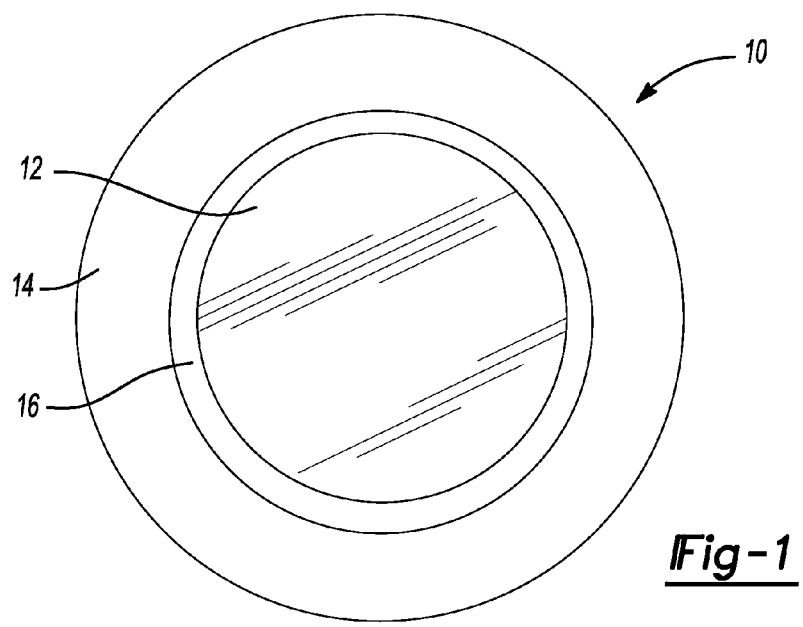
FIG. 1 is a top view of a sight glass assembly according to teachings of the present disclosure.

Example embodiments will now be described more fully with reference to the accompanying drawings. The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Spatially relative terms, such as "inner," "outer," "beneath," "below," "lower," "above," "upper" and the like may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosure describes an assembly for a hermetic glass-to-metal compression seal and method of manufacturing such a seal. Generally speaking, the assembly includes a glass component, which may, for example, comprise a sight glass material or a sealing glass material; an intermediate component; and a ring component. The glass component is closely surrounded at its outer periphery by the intermediate component, and the intermediate component is surrounded at its outer periphery by the ring component, which is attached with a compression fit as herein described.

The respective coefficients of thermal expansion for the glass component and the ring component vary, such that the coefficient of thermal expansion of the ring component is greater than the coefficient of thermal expansion for the glass component. The glass-to-metal compression seal assembly is achieved when the heated and thermally expanded ring component, after being placed around the intermediate and glass components, cools and shrinks to create a hermetic compression seal at the interfaces of the glass component and intermediate component and the intermediate component and the ring component.

The intermediate component comprises a relatively malleable material (in comparison to the glass component and the ring component) such that it can flow under the compressive force created by the cooling ring component in order to fill any micro-spaces at the respective interfaces between the intermediate portion and the glass and ring components. The resulting flow of the intermediate component mechanically joins or interlocks the respective components of the assembly to achieve the desired seal. The glass component may or may not additionally be fused to the intermediate component. As used herein, "fused" means united by, or as if by, melting together. Fused materials are typically joined by a chemical, molecular, and/or cohesive bond. A glass-to-metal compression seal can be achieved according to the disclosure with or without fusing the glass component to the intermediate component.

Referring to FIG. 1, a sight glass assembly 10 according to the teachings of the present disclosure includes a center component/transparent component 12 (such as a lens, for example), an outer ring 14, and an intermediate component 16 therebetween. The transparent component 12 may be any fusible or non-fusible glass, crystalline material, or ceramic material (including single crystal and poly-crystal). For example, borosilicates, soda lime silicates and sapphire (crystalline) are suitable materials for the transparent component 12. While the transparent component 12 is shown to have a generally circular shape in FIG. 1, the transparent component 12 may have another suitable shape or configuration.

Figure 2:
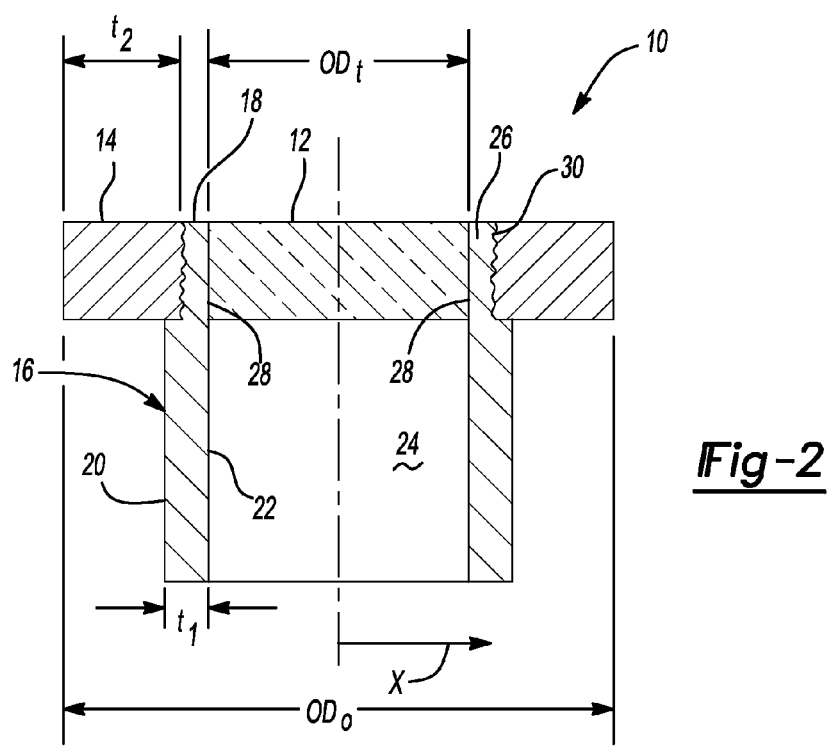
FIG. 2 is a cross-sectional view of a sight glass assembly according to teachings of the present disclosure.

Referring to FIG. 2, the intermediate component 16 includes a tubular thin-wall structure that includes a first portion 18, a second portion 20, an inner peripheral surface 22, and an inner space 24 defined by the inner peripheral surface 22. The "thin-wall structure" includes a wall that is relatively thin compared with sizes of the transparent component 12 and the outer ring 14 so that the "thin" wall can be squeezed and crimped between the outer ring 14 and the transparent component 12 when a compressive force is applied. The coefficient of thermal expansion of the outer ring 14 is greater than that of the transparent component 12. Therefore, a difference in cold shrinkage between the outer ring 14 and the transparent component 12 results in a compressive force at interfaces between the transparent component 12 and the first portion 18 of the intermediate component 16 and between the outer ring 14 and the first portion 18 of the intermediate component 16. The first portion 18 of the intermediate component 16 is thus squeezed and crimped by the compressive force between the outer ring 14 and the transparent component 12.

For example only, a ratio of the thickness of the 'thin wall" over an outside diameter of the transparent component 12 (i.e., $t_1/OD_t$) or the ratio of the thickness ($t_1$) of the "thin wall" over the thickness ($t_2$) of a tubular wall of the outer ring 14 along a radial direction (i.e., $t_1/t_2$) may vary depending on materials and coefficients of thermal expansion of the individual components of the sight glass assembly 10. For example only, the outside diameter $OD_o$ of the outer ring 14 over the outside diameter $OD_t$ of the transparent component 12 (i.e., $OD_o/OD_t$) should be large enough so that the outer ring 14 and the transparent component 12 can exert sufficient compressive force on the intermediate component 16 to squeeze and crimp the intermediate component 16 between the outer ring 14 and the transparent component 12. In the illustrative example, $t_1/t_2$ is approximately ⅓.

The first portion 18 is joined to the transparent component 12 and the outer ring 14. An outer periphery of the transparent component 12 may also be fused to the inner peripheral surface 22 of the intermediate component 16 adjacent to the first portion 18. The second portion 20 can be attached to a process tube or a vessel (not shown) in order to mount the sight glass assembly 10 to the process tube or the vessel. The first portion 18 may have a thickness measured along a radial direction X that is equal to or less than that of the second portion 20.

While the first portion 18 is shown in FIG. 2 to be provided at an edge of the intermediate component 16 which is in the form of a tubular thin wall structure, the first portion 18 can be provided at any part of the intermediate component 16. The "first" portion 18 is used to refer to a portion of the intermediate component 16 that is joined to the transparent component 12, whereas the "second" portion 20 is used to refer to a portion of the tubular thin-wall that is not joined to the transparent component 12.

The intermediate component 16 is joined to the transparent component 12. The intermediate component 16 is made of a metal having a melting point lower than or equal to that of the outer ring 14. Suitable materials for the intermediate component 16 include, but are not limited to, copper, copper alloys, stainless steel, iron, and iron alloys.

The outer ring 14 is made of a metal having sufficient mechanical strength to protect the transparent component 12 against radial impact. The outer ring 14 may have a closed ring shape and be mounted around the first portion 18 of the intermediate component 16. Alternatively, the outer ring 14 may include a plate of any shape (for example, a square plate) with a circular or oval hole in which the first portion 18 is inserted. The outer ring 14 has a yield strength and coefficient of thermal expansion each greater than or equal to that of the intermediate component 16. When assembled, the outer ring 14 compresses the first portion 18 between the transparent component 12 and the outer ring 14 and deforms the first portion 18.

The outer ring 14 may be made of weldable or non-weldable metals. Suitable materials for the outer ring 14 include, but are not limited to, copper alloys, stainless steels (both Austenitc and Ferritic), cold-rolled steels (CRS), iron, iron alloys, ferrous alloys (which may or may not be nickel-plated).

To manufacture the sight glass assembly 10, the transparent component 12 is placed in the inner space 24 defined by the intermediate component 16. The outer ring 14 is assembled around the first portion 18 of the intermediate component 16. The assembly of transparent component 12, the outer ring 14, and the intermediate component 16 is placed upside down so that the second portion 20 is on top and the first portion 18 is at the bottom. The assembly is placed in a high temperature oven (such as, for example only, a glass sealing oven) for heating, melting, joining, and cooling the sight glass assembly 10.

More specifically, the sight glass assembly 10 is heated to approximately 600° C. to 1250° C. At the elevated temperatures, the transparent component 12, the intermediate component 16, and the outer ring 14 expand. The intermediate component 16 has a coefficient of thermal expansion greater than that of the transparent component 12. The difference in the thermal expansion results in an annular gap between the transparent component 12 and the intermediate component 16.

The transparent component 12 softens at a glass transition temperature. For a soda-lime glass, the glass transition temperature is approximately 520-600° C. Upon continued heating, the transparent component 12 changes to a molten state. The transparent component 12 in its molten state flows to fill the annular gap. Thereafter, the sight glass assembly 10 is moved to a cooling zone of the glass sealing oven. As the temperature of the sight glass assembly 10 decreases to the glass transition temperature of the transparent component 12, the transparent component 12 begins to solidify. The molten material in the annular gap solidifies, causing the transparent component 12 to join, and possibly fuse, to the inner peripheral surface 22 of the intermediate component 16.

As the temperature of the sight glass assembly 10 continues to decrease, the transparent component 12, the outer ring 14, and the intermediate component 16 begin to shrink due to cold shrinkage. The inner peripheral surface 22 of the intermediate component 16 is already joined to the transparent component 12 prior to the process of cold shrinking. The inside diameter of the intermediate component 16 is equal to the outside diameter of the transparent component 12 when the cold shrinking starts. Therefore, the shrinking of the intermediate component 16 is restrained by the transparent component 12. The restrained shrinking of the intermediate component 16 results in a compressive force at the interface between the transparent component 12 and the intermediate component 16. The compressive force is applied by the transparent component 12 around the inner periphery of the intermediate component 16.

Prior to heating, the inside diameter of the outer ring 14 may be greater than the outside diameter of the first portion 18 of the intermediate component 16 so that the outer ring 14 can be assembled to the intermediate component 16. A gap may be present between the outer ring 14 and the intermediate component 16. Upon heating, the gap may be enlarged if the thermal expansion of the outer ring 14 is different from the intermediate component 16. The gap is reduced during cooling. The gap, however, cannot be reduced to the original size before the sight glass assembly 10 is heated because the intermediate component 16 cannot shrink to its original size with the restraints of the transparent component 12. At one point, the inside diameter of the outer ring 14 becomes equal to the outside diameter of the intermediate component 16 and the inner peripheral surface of the outer ring 14 contacts the outer peripheral surface of the intermediate component 16.

Figure 3:
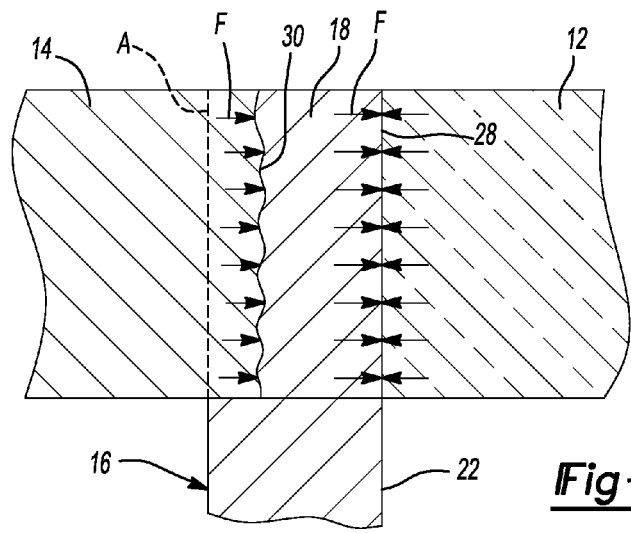
FIG. 3 is a schematic view illustrating interfaces among a transparent component, an outer ring, and an intermediate component of a sight glass assembly according to teachings of the present disclosure.

Referring to FIG. 3, the dashed line A represents the interface between the intermediate component 16 and the outer ring 14 when the outside diameter of intermediate component 16 is equal to the inside diameter of the outer ring 14. No force is applied between the first portion 18 of the intermediate component 16 and the outer ring 14 at this point. The first portion 18 and the second portion 20 may be parts of an integral thin-wall structure that has a constant thickness. Therefore, at this point, the first portion 18 has a thickness equal to that of the second portion 20.

As the temperature of the sight glass assembly 10 continues to decrease, the outer ring 14 starts to compress the intermediate component 16 due to a difference in thermal expansion and the relative malleability of the intermediate component 16. The outer ring 14 has a coefficient of thermal expansion greater than that of the intermediate component 16. Therefore, the outer ring 14 shrinks to a greater extent than the intermediate component 16. When the inside diameter of the outer ring 14 becomes smaller than the outside diameter of the tubular thin-wall structure of the intermediate component 16, the contracted outer ring 14 imparts a compressive force F at the interface between the outer ring 14 and the intermediate component 16.

As the temperature continues to decrease, the compressive force F increases. When the compressive force F becomes greater than the yield strength of the intermediate component 16, the first portion 18 of the intermediate component 16 undergoes plastic deformation. The outer ring 14 has a yield strength greater than the expected compressive force and does not yield. Therefore, the outer ring 14 deforms and squeezes the first portion 18 between the transparent component 12 and the outer ring 14 until the compressive force F is applied directly to the transparent component 12. A metal to metal seal 30 is formed between the outer ring 14 and the intermediate component 16 due to shrink contact. It is noted that a hermetic seal is not necessary between the outer ring 14 and the intermediate component 16.

The thickness of the thin-wall structure of the intermediate component 16 is selected so that when the first portion 18 is deformed by the outer ring 14, the compressive force F can squeeze the first portion 18 against the transparent component 12 and be applied directly to the transparent component 12. The first portion 18 becomes crimped and the thickness of the first portion 18 is reduced. The outer ring 14 has sufficient mechanical strength to apply the compressive force against the transparent component 12 without yielding and to protect the transparent component 12 against an impact force.

Similarly, as the temperature decreases, a compressive force is generated between the intermediate component 16 and the transparent component 12 to help deform the intermediate component 16. The compressive force is applied radially of the transparent component 12 to ensure that compressive seals are formed between the transparent component 12 and the intermediate component 16 and between the intermediate component 16 and the outer ring 14. Such compression not only securely holds the transparent component 12 inside the intermediate component 16, but also improves the sealing therebetween. The compressive seal 28 between the transparent component 12 and the intermediate component 16 is pressure resistant and durable and can prevent helium leakage. The compressive seal 28 may have a leakage rate below $1\times10^{-9}$ mba·l/sec.

After the sight glass assembly 10 is completed, the sight glass assembly 10 is connected to the process tube by soldering or brazing the second portion 20 of the intermediate component 16 to the process tube. The materials of the intermediate component 16 are not limited to those with high melting points and may be selected to have properties similar to those of the process tube to facilitate joining therebetween. For example, when the process tube is made of copper, the intermediate component 16 may be made of copper so that the sight glass assembly 10 can be joined to the process tube by soldering.

Similarly, the materials of the outer ring 14 are not limited to weldable metals, thereby increasing a selection of materials (such as austenitic stainless steel) for the outer ring 14. The increased selection of materials for the intermediate component 16 and the outer ring 14 increases the selection of joining methods (for example, welding, brazing and soldering). Therefore, manufacturing time and costs can be significantly reduced.

Figure 4:
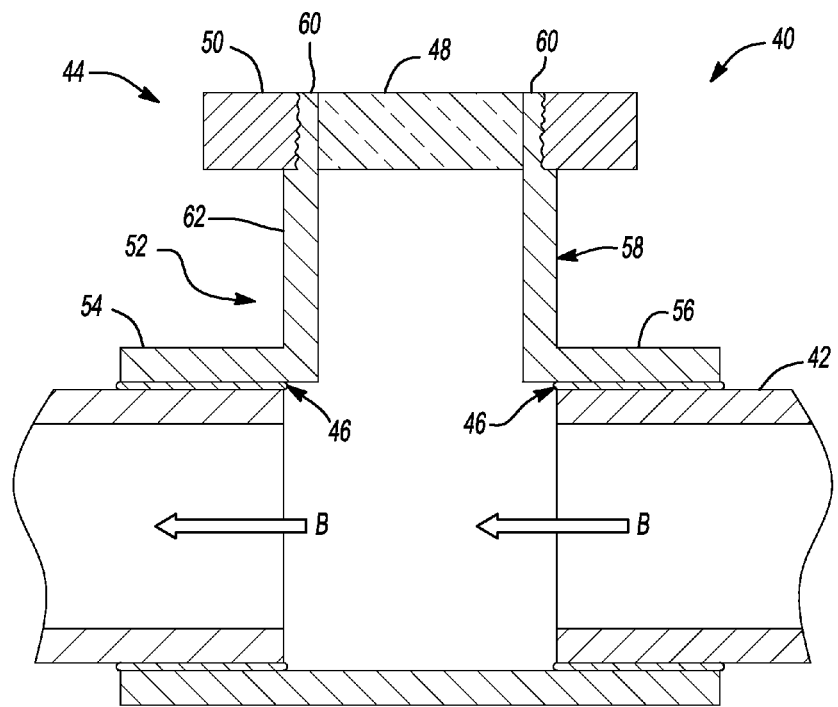
FIG. 4 is a cross-sectional view of a vessel that incorporates a sight glass assembly according to teachings of the present disclosure.

Referring to FIG. 4, a vessel 40 includes a process tube 42 and a sight glass assembly 44 joined to the process tube 42 at joints 46. The joints 46 may be a solder joint, a brazing joint or formed by any other joining methods. The sight glass assembly 44 includes a transparent component 48, an outer ring 50, and an intermediate component 52. The transparent component 48 and the outer ring 50 have structures similar to the transparent component 12 and the outer ring 14 of FIGS. 1 and 2.

The intermediate component 52 defines a T-shape tubular body including a first tube 54, a second tube 56, and a third tube 58. The first tube 54 and the second tube 56 are aligned and are connected to the process tube 42. Arrow B indicates the flow direction of the fluid carried in the fluid-carrying apparatus 40. The third tube 58 includes a thin-wall structure that includes a first portion 60 and a second portion 62. The first portion 60 is fused to the transparent component 48. The second portion 62 is provided adjacent to the first tube 54 and the second tube 56. The T-shaped tube body can be a standard T tube made of a material similar to that of the process tube 42. Therefore, the sight glass assembly 44 can be connected to the process tube 42 by soldering.

According to the present disclosure, the sight glass assembly 10 or 44 may include an intermediate component 16 or 52 that has a configuration adapted for the process tube 42 or a housing body of the vessel 40. Therefore, any existing or standard tubes may be used as the intermediate component 16 or 52 to facilitate joining of the intermediate component to the process tube 42 or housing body of the vessel 40. Moreover, the intermediate component 16 or 52 may be formed of a material that can be joined to the process tube 42 or the housing body by welding, brazing or soldering. Therefore, the manufacturing and assembling costs of the sight glass assembly can be significantly reduced.

Moreover, because the sight glass assembly of the present disclosure increases selection of materials and can be easily joined to another material, the sight glass assembly may find more applications other than a process tube or a fluid-carrying apparatus. For example, the sight glass assembly may be joined to a can or incorporated in any other thin-wall component in which a hermetic and transparent function is required (e.g., liquid level monitoring, light monitoring, color monitoring etc.) Further, a sensor may be inserted through the transparent component 48 of the sight glass assembly 10 for monitoring the conditions of the fluid contained in the process tube.

Figure 5:
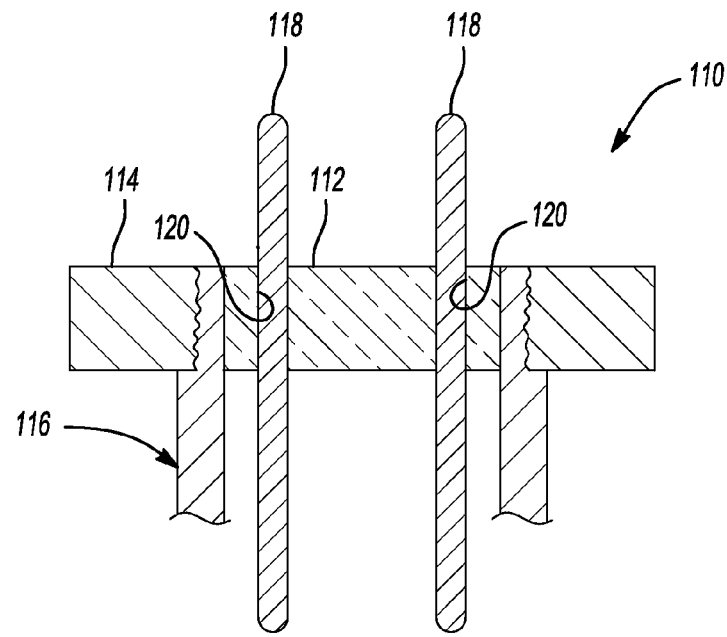
FIG. 5 is a partial cross-sectional view of a hermetic terminal assembly according to teachings of the present disclosure.
Figure 6:
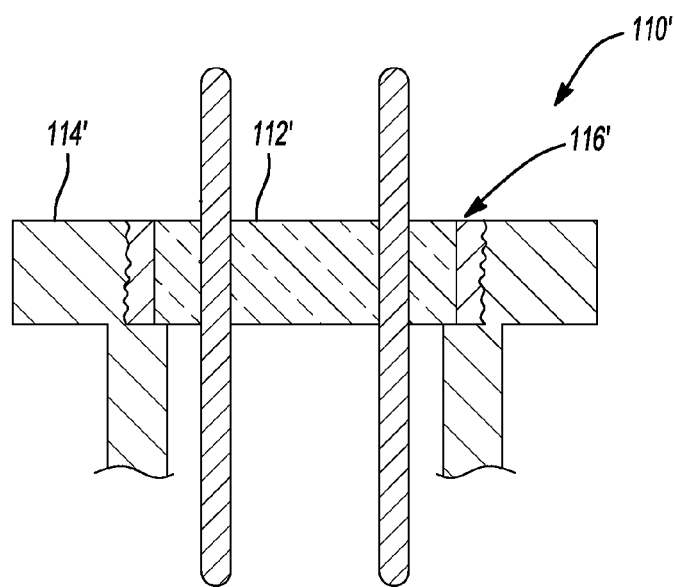
FIG. 6 is a partial cross-sectional view of another hermetic terminal assembly according to the teachings of the present disclosure.

With additional reference to FIGS. 5 and 6, the present teachings further provide for a hermetic terminal assembly 110, which includes at least one current conducting member 118 for conducting electrical current from one side of the terminal assembly 110 to another side of the terminal assembly 110. As shown in FIG. 5, the construction of the terminal assembly 110 in certain aspects is substantially similar to the sight glass assembly 10. Accordingly, the descriptions of the various components of the sight glass assembly 10 are applicable to the terminal assembly 110. However, it is important to note that the center glass seal component 112 is of a glass formulation that is suitable for providing a hermetic, glass-to-metal seal with the current conducting member 118.

The terminal assembly 110 can be manufactured in the same manner as the sight glass assembly 10. Therefore, the method of manufacturing the sight glass assembly 10 described herein also describes a method of manufacturing the terminal assembly 110.

Similar to the sight glass assembly 10 and the sight glass assembly 44, the intermediate component 116 of the terminal assembly 110 can be mounted to any suitable device using any suitable joining device or method. For example, the intermediate component 116 can be mounted to the process tube 42 of the vessel 40 via the joints 46 in a manner similar to that described and illustrated in FIG. 4 with respect to the intermediate component 52.

The current conducting member 118 extends through the center glass seal component 112 and can conduct an electrical signal across the center glass seal component 112, such as for use with, e.g., a moisture sensor, a flow sensor, and/or controls, or the like. The current conducting member 118 can comprise any of a variety of suitable forms of conductors, such as a pin, wire, rod, plate, rolled sheet, or flat sheet. The conductor 118 can be made of any suitable conductive material, such as copper, gold, steel or copper core steel. The current conducting member 118 can be unitary or modular. As illustrated in FIG. 5, a plurality of current conducting members 118 can be provided through the glass sealing component 112.

The current conducting member 118 can be sealed within the glass sealing component 112 in any suitable manner to form a hermetic seal between the current conducting member 118 and the glass sealing component 112. For example, the glass sealing component 112 can be pre-formed with the current conducting member 118 already having been hermetically sealed therein (a so-called "all-glass terminal") prior to assembling the glass sealing component 112 with the outer ring 114 and the intermediate component 116 to make the terminal assembly 110. Alternatively, the glass sealing component 112 can be pre-formed with one or more through-holes 120 that extend completely through the glass sealing component 112 and are each sized and shaped to receive a current conducting member 118. Prior or subsequent to joining the glass sealing component 112 with the outer ring 114 and the intermediate component 116, the current conducting member 118 can be inserted in the hole 120. When the glass sealing component 112 cools from being heated to the molten state during the manufacturing process, it forms a hermetic seal with the current conducting member 118. Still further, the current conducting member 118 can be inserted into the glass sealing component 112 while in a molten state during assembly, thus eliminating the need for the pre-formed holes 120.

With specific reference to FIG. 6, an alternate configuration of a terminal assembly 110' is shown. In terminal assembly 110', the outer ring 114' comprises, for example, a flange portion of a housing. The intermediate component 116' is received in the flange portion. During assembly, the flange portion and intermediate component 116' are heated so that they thermally expanded. An unheated, preformed all-glass terminal 112' is then inserted into the opening provided at the intermediate component 116'. The terminal assembly 110' is then cooled. As described above, a hermetic glass-to-metal compression seal is formed.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A sight glass assembly, comprising:
a glass component having a first outer peripheral surface;
an intermediate component comprising a tubular, thin-wall structure defining an opening having a first inner peripheral surface and a first portion having a first wall thickness and a second portion having a second wall thickness;
wherein the glass component is located within the thin-wall structure of the intermediate component such that the first portion of the thin-wall structure completely surrounds the first outer peripheral surface of the glass component and engages the glass component with a compression fit; and
an outer ring defining a second inner peripheral surface located around a second outer peripheral surface of the first portion of the intermediate component such that the second inner peripheral surface of the outer ring engages the second outer peripheral surface of the intermediate component with a compression fit and the first portion of the thin-wall structure of the intermediate component is plastically deformed and the first wall thickness is less than the second wall thickness; and
wherein a coefficient of thermal expansion of the outer ring is greater than a coefficient of thermal expansion of the intermediate component, and the coefficient of thermal expansion of the intermediate component is greater than a coefficient of thermal expansion of the transparent component.

2. The sight glass assembly of claim 1, wherein the intermediate component is made of a first metal and the outer ring is made of a second metal, wherein the second metal has a melting point greater than that of the first metal.

3. The sight glass assembly of claim 2, wherein the intermediate component is made of a solderable or brazable material.

4. The sight glass assembly of claim 1, wherein the intermediate component defines a first thickness along a radial direction of the intermediate component and the outer ring defines a second thickness along the radial direction, wherein the second thickness is at least three times the first thickness.

5. The sight glass assembly of claim 1, further comprising a tubular member for carrying fluid, wherein the tubular member is joined to the intermediate component by at least one of a solder joint and a brazing joint.

6. The sight glass assembly of claim 1 wherein the intermediate component comprises a material selected from a group of copper, ferrous alloy, and aluminum.

7. The sight glass assembly of claim 1, wherein the outer ring comprises a material selected from a group of stainless steel, cold-rolled steel (CRS), iron, iron alloy, and ferrous alloy.

8. The sight glass assembly of claim 1, further comprising:
   a housing body;
   wherein the intermediate component is directly joined to the housing body by at least one of a solder joint and a brazing joint.

9. The sight glass assembly of claim 8, wherein the intermediate component and the housing body are made of the same material.

10. The sight glass assembly of claim 8, wherein the outer ring possesses a mechanical strength and a dimension sufficient to protect the transparent component against an impact force.

11. The sight glass assembly of claim 8 wherein the outer ring is made of a non-weldable material.

\* \* \* \* \*